(12) United States Patent  
Liang et al.

(10) Patent No.: US 10,594,590 B2  
(45) Date of Patent: Mar. 17, 2020

(54) METHOD AND APPARATUS FOR MANAGING PHYSICAL LOCATION OF NETWORK DEVICE

(71) Applicant: Huawei Technologies Co., Ltd., Shenzhen (CN)

(72) Inventors: Jianyao Liang, Hangzhou (CN); Tao Yang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 189 days.

(21) Appl. No.: 15/175,809

(22) Filed: Jun. 7, 2016

(65) Prior Publication Data

US 2016/0294671 A1 Oct. 6, 2016

Related U.S. Application Data

(63) Continuation of application No. PCT/CN2013/090960, filed on Dec. 30, 2013.

(51) Int. Cl.
*H04L 12/751* (2013.01)
*H04L 29/12* (2006.01)
*H04L 12/733* (2013.01)

(52) U.S. Cl.
CPC ............ *H04L 45/02* (2013.01); *H04L 45/122* (2013.01); *H04L 61/103* (2013.01);
(Continued)

(58) Field of Classification Search
CPC ............ C12Q 1/6886; C12Q 2600/106; C12Q 2600/156; C12Q 2600/158; G01N 33/574;
(Continued)

(56) References Cited

U.S. PATENT DOCUMENTS

2012/0089713 A1* 4/2012 Carriere ............... H04L 12/4641  
   709/222  
2012/0124194 A1* 5/2012 Shouraboura ......... H04L 45/122  
   709/224

(Continued)

FOREIGN PATENT DOCUMENTS

| CN | 1505323 A | 6/2004 |
| CN | 102316488 A | 1/2012 |
| JP | H09186716 A | 7/1997 |

OTHER PUBLICATIONS

Amazon, "22 W1 IPTV Box + LT Wifi + HDMI + Remote + R Adapter," retrieved from the internet at https:/ www.amazon.com/%0bBUILT-CABLE-REMOTE-POWER-ADAPTER/dp/B07DXFB2JR on May 7, 2019, 7 pages.

(Continued)

*Primary Examiner* — Jason E Mattis  
*Assistant Examiner* — Nizam U Ahmed  
(74) *Attorney, Agent, or Firm* — Conley Rose, P.C.

(57) ABSTRACT

A method and an apparatus for managing a physical location of a network device. The method includes saving, in a first location table, received location information that is sent by a first network device, acquiring topology information of an entire network by communicating with a network controller, searching the topology information for a first top-of-rack switch that has a minimum network hop count to reach the first network device, adding the physical address of the first top-of-rack switch in the first location table to serve as a physical address of the first network device, and building an association between the physical address and the location information of the first network device. Therefore, a physical location of a network device can be conveniently and quickly managed, thereby greatly reducing a manual workload.

20 Claims, 4 Drawing Sheets

(52) U.S. Cl.
CPC ........ *H04L 61/2007* (2013.01); *H04L 61/609* (2013.01); *H04L 61/6022* (2013.01)

(58) Field of Classification Search
CPC .... G01N 27/9033; G01B 7/023; G01D 5/202; G03F 7/70775; G03F 7/7085; H04L 45/02; H04L 45/122; H04L 61/103; H04L 61/2007
USPC .......................................................... 370/255
See application file for complete search history.

(56) References Cited

U.S. PATENT DOCUMENTS

| | | | | |
|---|---|---|---|---|
| 2012/0155467 | A1* | 6/2012 | Appenzeller | H04L 45/54 370/392 |
| 2012/0158998 | A1* | 6/2012 | O'Shea | H04L 69/40 709/245 |
| 2012/0303767 | A1* | 11/2012 | Renzin | G06F 15/177 709/220 |
| 2013/0089104 | A1* | 4/2013 | Davis | H04L 45/60 370/401 |
| 2013/0205043 | A1* | 8/2013 | Lu | H04L 12/4633 709/244 |
| 2013/0332602 | A1* | 12/2013 | Nakil | H04L 41/147 709/224 |

OTHER PUBLICATIONS

Wikipedia, "Product (business)," retrieved by the internet at https://en.wikipedia.org/wiki/Product_(business)#Product_model on May 7, 2019, 4 pages.

"OpenFlow Switch Specification," Version 1.4.0, Wire Protocol 0x05, ONF TS-012, Oct. 14, 2013, 206 pages.

Foreign Communication From a Counterpart Application, PCT Application No. PCT/CN2013/090960, English Translation of International Search Report dated Oct. 10, 2014, 2 pages.

Foreign Communication From a Counterpart Application, PCT Application No. PCT/CN2013/090960, English Translation of Written Opinion dated Oct. 10, 2014, 5 pages.

* cited by examiner

METHOD AND APPARATUS FOR MANAGING PHYSICAL LOCATION OF NETWORK DEVICE

CROSS-REFERENCE TO RELATED APPLICATIONS

This application is a continuation of International Application No. PCT/CN2013/090960, filed on Dec. 30, 2013, which is hereby incorporated by reference in its entirety.

TECHNICAL FIELD

Embodiments of the present disclosure relate to the field of communications technologies, and in particular, to a method and an apparatus for managing a physical location of a network device.

BACKGROUND

In an existing network, one data center includes n equipment rooms, and one equipment room includes n racks, where a location of a rack is generally fixed. One switch (generally the switch is not changed) is installed on the top of each rack. Each network device on the rack is directly or indirectly connected to the top-of-rack switch to communicate with an external network. As a scale of the data center and the equipment room continuously increases, the number of various network devices continuously increases. When a network device becomes faulty during network device management, a physical location of the faulty network device generally needs to be quickly and accurately identified.

To resolve the foregoing problem, a manner of manually planning is used in the prior art, including segmenting Internet Protocol (IP) addresses, allocating segmented IP addresses to the equipment rooms, further segmenting the IP addresses of the equipment rooms, allocating segmented IP addresses to different racks according to an order, sorting network devices on a same rack according to an order of values of IP addresses, and finally, saving a plan related to the IP addresses and physical locations to a database or depicting the plan on a drawing. When a network device of a specified IP address needs to be found, a physical location of the device is found according to information in the database or the drawing.

It can be seen that planning, recording, and saving of an IP address and a physical location in the foregoing process are all manually performed. Therefore, a manual workload is heavy.

SUMMARY

Embodiments of the present disclosure provide a method and an apparatus for managing a physical location of a network device such that a physical location of a network device can be conveniently and quickly managed, thereby greatly reducing a manual workload.

According to a first aspect, an embodiment of the present disclosure provides a method for managing a physical location of a network device, including saving, in a first location table, received location information that is sent by a first network device after the first network device is powered on or when an IP address of the first network device changes, where the location information of the first network device includes the IP address and a device model of the first network device, acquiring topology information of an entire network by communicating with a network controller, searching the topology information for a first top-of-rack switch that has a minimum network hop count to reach the first network device, and using a physical address corresponding to an IP address of the first top-of-rack switch as a physical address of the first network device, and adding the physical address of the first network device to a location that is corresponding to the IP address, the device model, and the physical address of the first network device and that is in the first location table.

In a first possible implementation manner of the first aspect, before saving, in a first location table, received location information that is sent by a first network device after the first network device is powered on or when an IP address of the first network device changes, the method further includes saving, in a second location table, received location information that is sent by a first top-of-rack switch after the first top-of-rack switch is powered on, where the location information of the first top-of-rack switch includes an IP address and a physical address of the first top-of-rack switch, where using a physical address corresponding to an IP address of the first top-of-rack switch as a physical address of the first network device includes using the physical address that is corresponding to the IP address of the first top-of-rack switch and stored in the second location table as the physical address of the first network device.

With reference to the first possible implementation manner of the first aspect, in a second possible implementation manner of the first aspect, before saving, in a second location table, received location information that is sent by a first top-of-rack switch after the first top-of-rack switch is powered on, the method further includes configuring the physical address of the first top-of-rack switch in the first top-of-rack switch, and setting a configuration item identifier of the first top-of-rack switch such that the first top-of-rack switch sends the location information of the first top-of-rack switch according to the configuration item identifier after the first top-of-rack switch is powered on.

With reference to the method described in any one of the first aspect to the second possible implementation manner of the first aspect, in a third possible implementation manner of the first aspect, after an entered first IP address of a network device is received, the method further includes searching the first location table for a physical address and a device model of the network device corresponding to the first IP address.

With reference to the third possible implementation manner of the first aspect, in a fourth possible implementation manner of the first aspect, the method further includes triggering the network device corresponding to the first IP address to send alarm indication information, or triggering a network device except the network device corresponding to the first IP address to send alarm indication information, or searching the topology information for the network device corresponding to the first IP address.

According to a second aspect, an embodiment of the present disclosure provides a location management server, including a storage module configured to save, in a first location table, received location information that is sent by a first network device after the first network device is powered on or when an IP address of the first network device changes, where the location information of the first network device includes the IP address and a device model of the first network device, an acquiring module configured to acquire topology information of an entire network by communicating with a network controller, a processing module configured to search the topology information for a first top-of-rack switch that has a minimum network hop count to reach the first network device, and use a physical address corresponding to an IP address of the first top-of-rack switch as a physical address of the first network device, where the processing module is further configured to add the physical address of the first network device to a location that is corresponding to the IP address, the device model, and the physical address of the first network device and that is in the first location table.

In a first possible implementation manner of the second aspect, the storage module is further configured to save, in a second location table, received location information that is sent by a first top-of-rack switch after the first top-of-rack switch is powered on, where the location information of the first top-of-rack switch includes an IP address and a physical address of the first top-of-rack switch before the received location information that is sent by the first network device after the first network device is powered on or when the IP address of the first network device changes is saved in the first location table, where that the processing module uses the physical address corresponding to the IP address of the first top-of-rack switch as the physical address of the first network device includes using the physical address that is corresponding to the IP address of the first top-of-rack switch and stored in the second location table as the physical address of the first network device.

With reference to the first possible implementation manner of the second aspect, in a second possible implementation manner of the second aspect, the processing module is further configured to, before the storage module saves, in the second location table, the received location information that is sent by the first top-of-rack switch after the first top-of-rack switch is powered on, configure the physical address of the first top-of-rack switch in the first top-of-rack switch, and set a configuration item identifier of the first top-of-rack switch such that the first top-of-rack switch sends the location information of the first top-of-rack switch according to the configuration item identifier after the first top-of-rack switch is powered on.

With reference to the location management server described in any one of the second aspect to the second possible implementation manner of the second aspect, in a third possible implementation manner of the second aspect, the location management server further includes a searching module configured to search the first location table for a physical address and a device model of the network device corresponding to the first IP address after an entered first IP address of a network device is received.

With reference to the third possible implementation manner of the second aspect, in a fourth possible implementation manner of the second aspect, the location management server further includes a triggering module configured to trigger the network device corresponding to the first IP address to send alarm indication information, or trigger a network device except the network device corresponding to the first IP address to send alarm indication information, where the searching module is further configured to search the topology information for the network device corresponding to the first IP address.

According to a third aspect, an embodiment of the present disclosure provides a location management server, including a receiver configured to save, in a first location table, received location information that is sent by a first network device after the first network device is powered on or when an IP address of the first network device changes, where the location information of the first network device includes the IP address and a device model of the first network device, where the receiver is further configured to acquire topology information of an entire network by communicating with a network controller, and a processor configured to search the topology information for a first top-of-rack switch that has a minimum network hop count to reach the first network device, and use a physical address corresponding to an IP address of the first top-of-rack switch as a physical address of the first network device, where the processor is further configured to add the physical address of the first network device to a location that is corresponding to the IP address, the device model, and the physical address of the first network device and that is in the first location table.

In a first possible implementation of the third aspect, the receiver is further configured to, before the received location information that is sent by the first network device after the first network device is powered on or when the IP address of the first network device changes is saved in the first location table, save, in a second location table, received location information that is sent by a first top-of-rack switch after the first top-of-rack switch is powered on, where the location information of the first top-of-rack switch includes an IP address and a physical address of the first top-of-rack switch, where that the processor uses the physical address corresponding to the IP address of the first top-of-rack switch as the physical address of the first network device includes using the physical address that is corresponding to the IP address of the first top-of-rack switch and stored in the second location table as the physical address of the first network device.

With reference to the first possible implementation manner of the third aspect, in a second possible implementation manner of the third aspect, the processor is further configured to, before the receiver saves, in the second location table, the received location information that is sent by the first top-of-rack switch after the first top-of-rack switch is powered on, configure the physical address of the first top-of-rack switch in the first top-of-rack switch, and set a configuration item identifier of the first top-of-rack switch such that the first top-of-rack switch sends the location information of the first top-of-rack switch according to the configuration item identifier after the first top-of-rack switch is powered on.

With reference to the location management server described in any one of the third aspect to the second possible implementation manner of the third aspect, in a third possible implementation manner of the third aspect, the processor is further configured to search the first location table for a physical address and a device model of the network device corresponding to the first IP address after an entered first IP address of a network device is received.

With reference to the third possible implementation manner of the third aspect, in a fourth possible implementation manner of the third aspect, the processor is further configured to trigger the network device corresponding to the first IP address to send alarm indication information, or trigger a network device except the network device corresponding to the first IP address to send alarm indication information, or search the topology information for the network device corresponding to the first IP address.

According to the method and the apparatus for managing a physical location of a network device that are provided in the embodiments of the present disclosure, an IP address and a device model that are reported by a first network device are saved. Then, topology information of an entire network is acquired by communicating with a network controller. The topology information is searched for a top-of-rack switch that has a minimum network hop count to reach the first network device, and a physical address corresponding to an IP address of the top-of-rack switch is used as a physical address of the first network device. Finally, the physical address of the first network device is added to a location that is corresponding to the IP address, the device model, and the physical address of the first network device and that is in a first location table. Therefore, a physical location of a network device can be conveniently and quickly managed, thereby greatly reducing a manual workload. When a network device needs to be found, a physical location of the network device may be quickly found, and a physical location of a network device whose IP address is dynamically and randomly allocated may further be managed.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and describes the technical solutions in the embodiments of the present disclosure with reference to the accompanying drawings in the embodiments of the present disclosure. The described embodiments are some but not all of the embodiments of the present disclosure. All other embodiments acquired by persons of ordinary skill in the art based on the embodiments of the present disclosure without creative efforts shall fall within the protection scope of the present disclosure.

A method for managing a physical location of a network device according to the embodiments of the present disclosure is mainly applied to software-defined networking (SDN). An OPENFLOW network is a type of SDN network. In the SDN/OPENFLOW network, a network controller can obtain a global topology view of network devices. According to the embodiments of the present disclosure, a network topology of an entire network is acquired from the network controller using this feature of the network controller in the SDN/OPENFLOW network. A rack location of a network device is determined based on a principle that a network device and a top-of-rack switch that has a minimum network hop count to reach the network device are in a same rack, and the rack location of the network device is recorded in a location management server. Therefore, a physical location of a network device can be conveniently and quickly managed, thereby greatly reducing a manual workload. When a network device needs to be found, the network device is triggered to send an audible/visual alarm, a user finds a rack according to a physical location (actually, a rack location) of the network device, and then the network device can be found according to the audible/visual alarm or a feature of connection to a port of a switch. In addition, according to the embodiments of the present disclosure, the physical location of the network device may also be managed when an IP address of the network device is random. For example, when the network device dynamically acquires the IP address using the dynamic host configuration protocol (DHCP) or another protocol, the IP address is random. An implementation process of the embodiments of the present disclosure is described in detail as follows with reference to the accompanying drawings.

Figure 1:
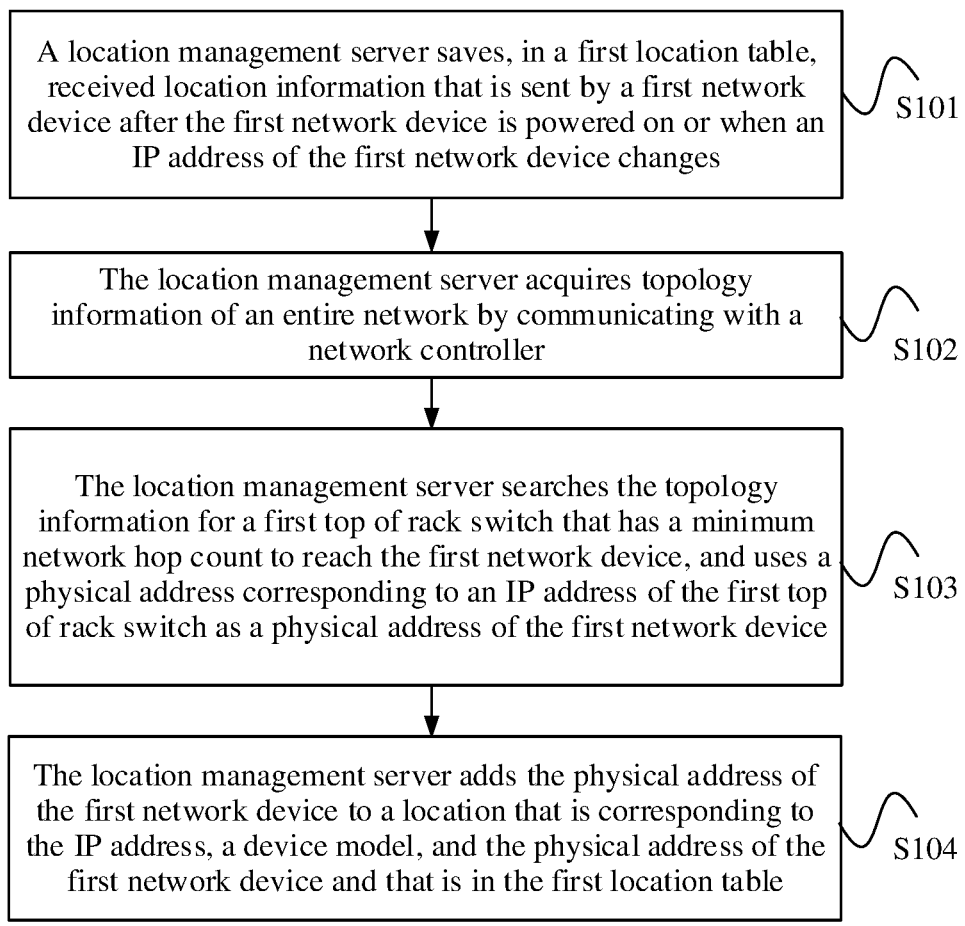
FIG. 1 is a flowchart of a first embodiment of a method for managing a physical location of a network device according to the present disclosure.

FIG. 1 is a flowchart of a first embodiment of a method for managing a physical location of a network device according to the present disclosure. This embodiment is described using an example in which a location management server is an execution body, where the location management server may be used as an independent device or may be used as a separate module that is deployed in a network controller. As shown in FIG. 1, the method in this embodiment may include the following steps.

Step S101: The location management server saves, in a first location table, received location information that is sent by a first network device after the first network device is powered on or when an IP address of the first network device changes, where the location information of the first network device includes the IP address and a device model of the first network device.

The first network device herein represents all network devices in a rack. After being powered on, the network device reports the IP address and the device model of the network device to the location management server. Herein, the IP address of the network device may be a static IP address or may be a dynamically acquired IP address. When the IP address of the first network device changes (for example, a network topology changes), the first network device needs to report the IP address and the device model of the first network device again. The location management server receives the IP address and the device model that are reported by the network device, and saves the IP address and the device model in the first location table.

Step S102: The location management server acquires topology information of an entire network by communicating with the network controller.

Step S103: The location management server searches the topology information for a first top-of-rack switch that has a minimum network hop count to reach the first network device, and uses a physical address corresponding to an IP address of the first top-of-rack switch as a physical address of the first network device.

Because a network device and a top-of-rack switch that has a minimum network hop count to reach the network device are in a same rack, the location management server searches the topology information for the first top-of-rack switch that has the minimum network hop count to the first network device, and uses the physical address corresponding to the IP address of the first top-of-rack switch as the physical address of the first network device.

Further, in an implementable manner, before step S101, the method further includes saving, in a second location table by the location management server, received location information that is sent by a first top-of-rack switch after the first top-of-rack switch is powered on, where the location information of the first top-of-rack switch includes an IP address and a physical address of the first top-of-rack switch.

Furthermore, before saving, in a second location table by the location management server, received location information that is sent by a first top-of-rack switch after the first top-of-rack switch is powered on, the method further includes configuring, by the location management server, the physical address of the first top-of-rack switch in the first top-of-rack switch, and setting a configuration item identifier of the first top-of-rack switch. For example, the configuration item identifier may be true, or the configuration item identifier is, for example, "1" such that the first top-of-rack switch sends the location information of the first top-of-rack switch according to the configuration item identifier after the first top-of-rack switch is powered on. The configuring the physical address of the first top-of-rack switch in the first top-of-rack switch may also be manually implemented.

In this case, step S103 in which the physical address corresponding to the IP address of the first top-of-rack switch is used as the physical address of the first network device further includes using the physical address that is corresponding to the IP address of the first top-of-rack switch and stored in the second location table as the physical address of the first network device.

Step S104: The location management server adds the physical address of the first network device to a location that is corresponding to the IP address, the device model, and the physical address of the first network device and that is in the first location table.

In this case, the IP address, the device model, and the physical address of the network device are all stored in the first location table, which is convenient for management. When a network device of a specified IP address needs to be found, a location of the network device can be quickly found according to a correspondence between an IP address, a device model, and a physical address that are stored in the first location table.

When searching for the location of the network device, network management staff enters the IP address of the network device that needs to be found. After receiving an entered first IP address of a network device, the location management server performs the process of searching the first location table for a physical address and a device model of the network device corresponding to the first IP address. Therefore, the network management staff may find, according to the physical address, the network device corresponding to the first IP address.

If the network device is faulty or communication between the location management server and the network device is faulty, further, in an implementable manner, the method may further include triggering, by the location management server, the network device corresponding to the first IP address to send alarm indication information, where the alarm indication information may be an audible alarm or a visual alarm, or triggering, by the location management server, a network device except the network device corresponding to the first IP address to send alarm indication information, where for example, when the communication between the location management server and the network device is faulty, after finding a rack location using a top-of-rack switch corresponding to the physical address of the network device corresponding to the IP address, the location management server triggers the network device except the network device corresponding to the first IP address to send the alarm indication information such that the network management staff may perform reverse exclusion according to the alarm indication information to accurately locate the faulty network device, or searching the topology information for the network device corresponding to the first IP address, where for example, after the network management staff finds, according to a physical address of a top-of-rack switch, a location of a top-of-rack switch of the network device corresponding to the first IP address, if the network device is directly connected to the switch (including the top-of-rack switch), the network device may be found by referring to a topology view for a switch port connected to the network device.

According to the method for managing a physical location of a network device, which is provided in this embodiment of the present disclosure, an IP address and a device model that are reported by a first network device are saved. Then, topology information of an entire network is acquired by communicating with a network controller. The topology information is searched for a top-of-rack switch that has a minimum network hop count to reach the first network device, and a physical address corresponding to an IP address of the top-of-rack switch is used as a physical address of the first network device. Finally, the physical address of the first network device is added to a location that is corresponding to the IP address, the device model, and the physical address of the first network device and that is in a first location table. Therefore, a physical location of a network device can be conveniently and quickly managed, thereby greatly reducing a manual workload. When a network device needs to be found, a physical location of the network device may be quickly found, and a physical location of a network device whose IP address is dynamically and randomly allocated may further be managed.

A specific embodiment is used in the following to further describe the foregoing method.

Figure 2:
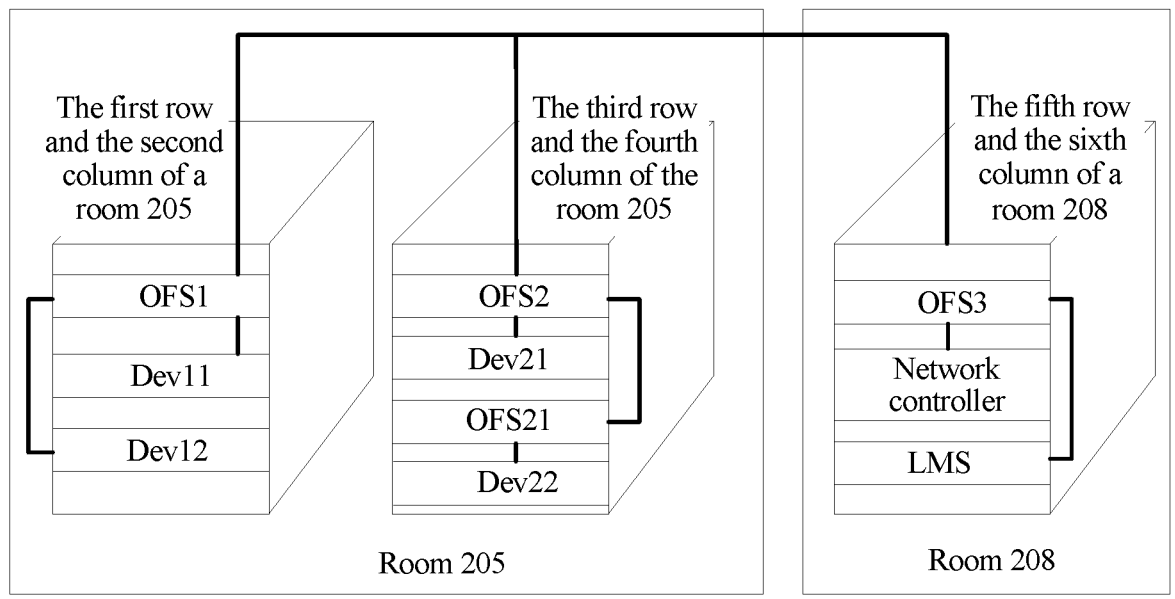
FIG. 2 is a schematic diagram of network deployment in a second embodiment of a method for managing a physical location of a network device according to the present disclosure.
Figure 3:
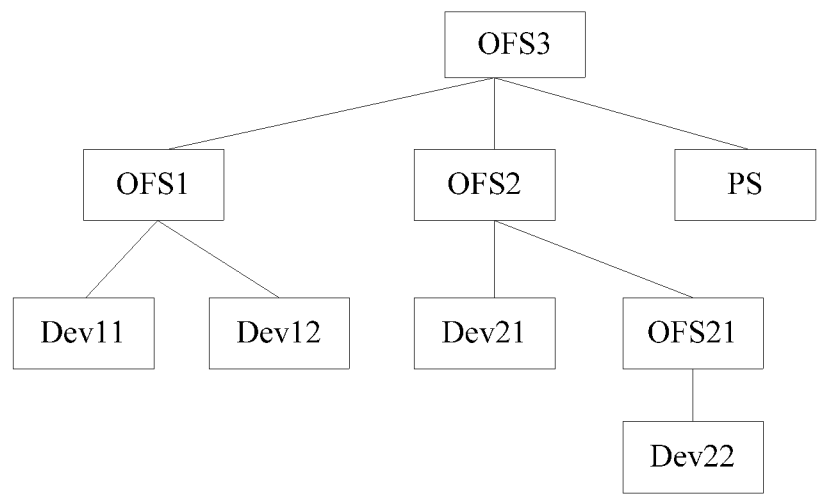
FIG. 3 is a network topology view of the second embodiment of the method for managing a physical location of a network device according to the present disclosure.

FIG. 2 is a schematic diagram of network deployment in a second embodiment of a method for managing a physical location of a network device according to the present disclosure. As shown in FIG. 2, a top-of-rack switch OFS3, a network controller, and a location management server (LMS) are all disposed in the fifth row and the sixth column of a room 208, a top-of-rack switch OFS1, a network device Dev11, and a network device Dev12 are disposed in the first row and the second column of a room 205, and a top-of-rack switch OFS2, a network device Dev21, a network device Dev22, and a common switch OFS21 in a rack are disposed in the third row and the fourth column of the room 205. FIG. 3 is a network topology view of the second embodiment of the method for managing a physical location of a network device according to the present disclosure. As shown in FIG. 3, according to the topology view, a network hop count between each network device and a top-of-rack switch is shown in Table 1.

TABLE 1

| Network device | Rack OFS | | |
| --- | --- | --- | --- |
| | OFS1 | OFS2 | OFS3 |
| Dev11 | 1 | 3 | 2 |
| Dev12 | 1 | 3 | 2 |
| Dev21 | 3 | 1 | 2 |

TABLE 1-continued

| | Rack OFS | | |
|---|---|---|---|
| Network device | OFS1 | OFS2 | OFS3 |
| OFS21 | 3 | 1 | 2 |
| Dev22 | 4 | 2 | 3 |

Figure 4:
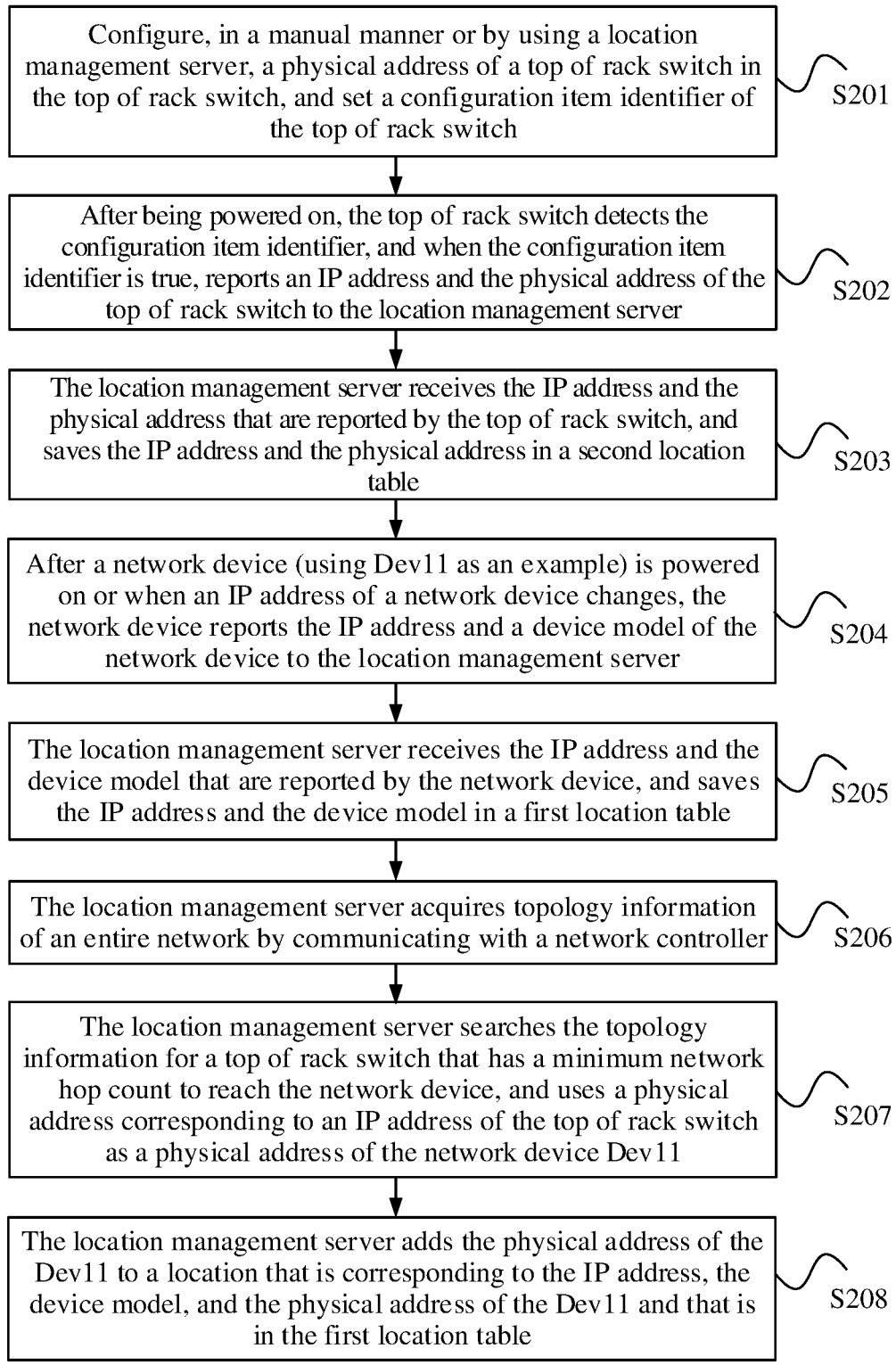
FIG. 4 is a flowchart of the second embodiment of the method for managing a physical location of a network device according to the present disclosure.

FIG. 4 is a flowchart of the second embodiment of the method for managing a physical location of a network device according to the present disclosure. As shown in FIG. 4, the method in this embodiment may include the following steps.

Step S201: Configure, in a manual manner or using the location management server, a physical address of a top-of-rack switch (for example, a physical address of the OFS1 is the first row and the second column of the room 205) in the top-of-rack switch, and set a configuration item identifier of the top-of-rack switch.

Step S202: After being powered on, the top-of-rack switch detects the configuration item identifier, and when the configuration item identifier is true, reports an IP address and the physical address of the top-of-rack switch to the location management server.

Step S203: The location management server receives the IP address and the physical address that are reported by the top-of-rack switch, and saves the IP address and the physical address in a second location table.

Step S204: After a network device (using the Dev11 as an example) is powered on or when an IP address of a network device changes, the network device reports the IP address and a device model of the network device to the location management server.

Step S205: The location management server receives the IP address and the device model that are reported by the network device, and saves the IP address and the device model in a first location table.

Step S206: The location management server acquires topology information of an entire network by communicating with the network controller.

Step S207: The location management server searches the topology information for a top-of-rack switch that has a minimum network hop count to reach the network device (using the Dev11 as an example), and uses a physical address corresponding to an IP address of the top-of-rack switch as a physical address of the network device Dev11.

Step S208: The location management server adds the physical address of the Dev11 to a location that is corresponding to the IP address, the device model, and the physical address of the Dev11 and that is in the first location table.

An operation process of another network device is similar.

When a location of a network device is searched for, an IP address of the network device searched for is entered. After receiving the entered IP address of the network device, the location management server performs the following process searching the first location table for a physical address and a device model of the network device corresponding to the IP address.

If the device is faulty or communication between the location management server and the network device is faulty, the process may further include triggering, by the location management server, a network device corresponding to a first IP address to send alarm indication information, where the alarm indication information may be an audible alarm or a visual alarm, or triggering, by the location management server, a network device except the network device corresponding to the first IP address to send alarm indication information, where for example, when the communication between the location management server and the network device is faulty, after finding a rack location using a top-of-rack switch corresponding to the physical address of the network device corresponding to the IP address, the location management server triggers the network device except the network device corresponding to the first IP address to send the alarm indication information such that network management staff may perform reverse exclusion according to the alarm indication information to accurately locate the faulty network device, or searching the topology information for the network device corresponding to the first IP address, where for example, after network management staff finds, according to a physical address of a top-of-rack switch, a location of a top-of-rack switch of the network device corresponding to the first IP address, if the network device is directly connected to the switch (including the top-of-rack switch), the network device may be found by referring to the topology view for a switch port connected to the network device.

Figure 5:
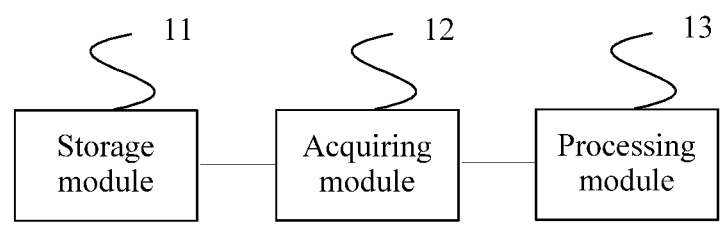
FIG. 5 is a schematic structural diagram of a first embodiment of a location management server according to the present disclosure.

FIG. 5 is a schematic structural diagram of a first embodiment of a location management server according to the present disclosure. As shown in the FIG. 5, an apparatus in this embodiment may include a storage module 11, an acquiring module 12, and a processing module 13. The storage module 11 is configured to save, in a first location table, received location information that is sent by a first network device after the first network device is powered on or when an IP address of the first network device changes, where the location information of the first network device includes the IP address and a device model of the first network device. The acquiring module 12 is configured to acquire topology information of an entire network by communicating with a network controller. The processing module 13 is configured to search the topology information for a first top-of-rack switch that has a minimum network hop count to reach the first network device, and use a physical address corresponding to an IP address of the first top-of-rack switch as a physical address of the first network device. The processing module 13 is further configured to add the physical address of the first network device to a location that is corresponding to the IP address, the device model, and the physical address of the first network device and that is in the first location table.

The storage module 11 is further configured to save, in a second location table, received location information that is sent by a first top-of-rack switch after the first top-of-rack switch is powered on, where the location information of the first top-of-rack switch includes an IP address and a physical address of the first top-of-rack switch before the received location information that is sent by the first network device after the first network device is powered on or when the IP address of the first network device changes is saved in the first location table. That the processing module 13 uses the physical address corresponding to the IP address of the first top-of-rack switch as the physical address of the first network device further includes using the physical address that is corresponding to the IP address of the first top-of-rack switch and stored in the second location table as the physical address of the first network device.

The processing module 13 is further configured to, before the storage module saves, in the second location table, the received location information that is sent by the first top-of-rack switch after the first top-of-rack switch is powered on, configure the physical address of the first top-of-rack switch in the first top-of-rack switch, and set a configuration item identifier of the first top-of-rack switch such that the first top-of-rack switch sends the location information of the first top-of-rack switch according to the configuration item identifier after the first top-of-rack switch is powered on.

In this case, the IP address, the device model, and the physical address of the network device are all stored in the first location table, which is convenient for management. When a network device of a specified IP address needs to be found, a location of the network device can be quickly found according to a correspondence between an IP address, a device model, and a physical address that are stored in the first location table.

When searching for the location of the network device, network management staff enters the IP address of the network device that needs to be found. The apparatus in this embodiment further includes a searching module, where the searching module is configured to search the first location table for a physical address and a device model of the network device corresponding to the first IP address after an entered first IP address of a network device is received.

The apparatus in this embodiment further includes a triggering module, where the triggering module is configured to trigger the network device corresponding to the first IP address to send alarm indication information, or trigger a network device except the network device corresponding to the first IP address to send alarm indication information.

The searching module is further configured to search the topology information for the network device corresponding to the first IP address. Furthermore, for example, after the network management staff finds, according to a physical address of a top-of-rack switch, a location of a top-of-rack switch of the network device corresponding to the first IP address, if the network device is directly connected to the switch (including the top-of-rack switch), the network device may be found by referring to a topology view for a switch port connected to the network device.

The location management server in this embodiment may be configured to implement the technical solution in the method embodiment shown in FIG. 1. The implementation principles thereof are similar, and are not described herein again.

According to the location management server provided in this embodiment of the present disclosure, a saving module saves an IP address and a device model that are reported by a first network device. Then, an acquiring module acquires topology information of an entire network by communicating with a network controller. A processing module searches the topology information for a top-of-rack switch that has a minimum network hop count to reach the first network device, and uses a physical address corresponding to an IP address of the top-of-rack switch as a physical address of the first network device, and finally, the processing module adds the physical address of the first network device to a location that is corresponding to the IP address, the device model, and the physical address of the first network device and that is in a first location table. Therefore, a physical location of a network device can be conveniently and quickly managed, thereby greatly reducing a manual workload. When a network device needs to be found, a physical location of the network device may be quickly found, and a physical location of a network device whose IP address is dynamically and randomly allocated may further be managed.

Figure 6:
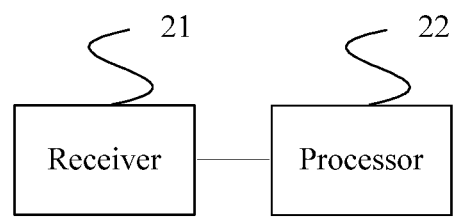
FIG. 6 is a schematic structural diagram of a second embodiment of a location management server according to the present disclosure.

FIG. 6 is a schematic structural diagram of a second embodiment of a location management server according to the present disclosure. As shown in the FIG. 6, an apparatus in this embodiment may include a receiver 21 and a processor 22. The receiver 21 is configured to save, in a first location table, received location information that is sent by a first network device after the first network device is powered on or when an IP address of the first network device changes, where the location information of the first network device includes the IP address and a device model of the first network device. The receiver 21 is further configured to acquire topology information of an entire network by communicating with a network controller. The processor 22 is configured to search the topology information for a first top-of-rack switch that has a minimum network hop count to reach the first network device, and use a physical address corresponding to an IP address of the first top-of-rack switch as a physical address of the first network device. The processor 22 is further configured to add the physical address of the first network device to a location that is corresponding to the IP address, the device model, and the physical address of the first network device and that is in the first location table.

The receiver 21 is further configured to save, in a second location table, received location information that is sent by a first top-of-rack switch after the first top-of-rack switch is powered on, where the location information of the first top-of-rack switch includes an IP address and a physical address of the first top-of-rack switch before the received location information that is sent by the first network device after the first network device is powered on or when the IP address of the first network device changes is saved in the first location table. That the processor 22 uses the physical address corresponding to the IP address of the first top-of-rack switch as the physical address of the first network device further includes using the physical address that is corresponding to the IP address of the first top-of-rack switch and stored in the second location table as the physical address of the first network device.

The processor 22 is further configured to, before the receiver 21 saves, in the second location table, the received location information that is sent by the first top-of-rack switch after the first top-of-rack switch is powered on, configure the physical address of the first top-of-rack switch in the first top-of-rack switch, and set a configuration item identifier of the first top-of-rack switch such that the first top-of-rack switch sends the location information of the first top-of-rack switch according to the configuration item identifier after the first top-of-rack switch is powered on.

In this case, the IP address, the device model, and the physical address of the network device are all stored in the first location table, which is convenient for management. When a network device of a specified IP address needs to be found, a location of the network device can be quickly found according to a correspondence between an IP address, a device model, and a physical address that are stored in the first location table.

When searching for the location of the network device, network management staff enters the IP address of the network device that needs to be found. The processor 22 is further configured to search the first location table for a physical address and a device model of the network device corresponding to the first IP address after an entered first IP address of a network device is received.

The processor is further configured to trigger the network device corresponding to the first IP address to send alarm indication information, or trigger a network device except the network device corresponding to the first IP address to send alarm indication information, where for example, when communication between the location management server and the network device is faulty, after finding a rack location using a top-of-rack switch corresponding to the physical address of the network device corresponding to the IP address, the location management server triggers the network device except the network device corresponding to the first IP address to send the alarm indication information such that the network management staff may perform reverse exclusion according to the alarm indication information to accurately locate the faulty network device, or search the topology information for the network device corresponding to the first IP address, where for example, after the network management staff finds, according to a physical address of a top-of-rack switch, a location of a top-of-rack switch of the network device corresponding to the first IP address, if the network device is directly connected to the switch (including the top-of-rack switch), the network device may be found by referring to a topology view for a switch port connected to the network device.

The location management server in this embodiment may be configured to implement the technical solution in the method embodiment shown in FIG. 1. The implementation principles thereof are similar, and are not described herein again.

According to the location management server provided in this embodiment of the present disclosure, a receiver saves an IP address and a device model that are reported by a first network device, and then the receiver acquires topology information of an entire network by communicating with a network controller, a processor searches the topology information for a top-of-rack switch that has a minimum network hop count to reach the first network device, and uses a physical address corresponding to an IP address of the top-of-rack switch as a physical address of the first network device, and finally, the processor adds the physical address of the first network device to a location that is corresponding to the IP address, the device model, and the physical address of the first network device and that is in a first location table. Therefore, a physical location of a network device can be conveniently and quickly managed, thereby greatly reducing a manual workload. When a network device needs to be found, a physical location of the network device may be quickly found, and a physical location of a network device whose IP address is dynamically and randomly allocated may further be managed.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random-access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for managing a physical location of a network device, wherein the method is applied to a network that comprises a plurality of network devices, a network controller, and a plurality of top-of-rack switches, wherein the method comprises:
saving, in a first location table, location information of a first network device of the network devices, wherein the location information of the first network device comprises an Internet Protocol (IP) address of the first network device and a device model of the first network device, and wherein the IP address of the first network device comprising a dynamic IP address;
acquiring topology information of the network by communicating with the network controller, wherein the topology information comprises a network hop count between each of the network devices and each of the top-of-rack switches;
selecting a first top-of-rack switch of the top-of-rack switches that has a minimum network hop count to reach the first network device according to the topology information;
adding a physical address of the first top-of-rack switch in the first location table to serve as a physical address of the first network device, wherein the physical address of the first top-of-rack switch comprises location information that identifies a physical location by row, column, and room where the first top-of-rack switch is located;
saving, in the first location table, a correspondence between the physical address and the location information of the first network device; and
updating the first location table having the correspondence between the physical address and the location information of the first network device when the dynamic IP address of the first network device changes.

2. The method of claim 1, wherein before saving, in the first location table, the location information of the first network device, the method further comprises saving, in a second location table, location information of the first top-of-rack switch, wherein the location information of the first top-of-rack switch comprises an IP address of the first top-of-rack switch and the physical address of the first top-of-rack switch, and wherein adding the physical address of the first top-of-rack switch in the first location table to serve as the physical address of the first network device comprises adding the physical address that is corresponding to the IP address of the first top-of-rack switch in the first location table to serve as the physical address of the first network device.

3. The method of claim 2, wherein before saving, in the second location table, the location information of the first top-of-rack switch, the method further comprises:
saving the physical address of the first top-of-rack switch in the first top-of-rack switch; and
setting a configuration item identifier of the first top-of-rack switch, wherein the configuration item identifier is used for the first top-of-rack switch to send the location information of the first top-of-rack switch.

4. The method of claim 1, further comprising:
receiving a first IP address of the network device; and
determining a physical address and a device model of the network device corresponding to the first IP address according to the first location table.

5. The method of claim 4, further comprising triggering the network device corresponding to the first IP address to send alarm indication information.

6. The method of claim 4, further comprising triggering another network device except the network device corresponding to the first IP address to send alarm indication information.

7. The method of claim 4, further comprising searching the topology information for the network device corresponding to the first IP address.

8. A device in a network that comprises a plurality of network devices, a network controller, and a plurality of top-of-rack switches, wherein the device comprises:
   a memory configured to store instructions; and
   a processor coupled to the memory and configured to execute the instructions to:
      save, in a first location table, location information of a first network device of the network devices, wherein the location information of the first network device comprises an Internet Protocol (IP) address of the first network device and a device model of the first network device, and wherein the IP address of the first network device comprising a dynamic IP address;
      acquire topology information of the network by communicating with the network controller, the wherein topology information comprises a network hop count between each of the network devices and each of the top-of-rack switches;
      select a first top-of-rack switch of the top-of-rack switches that has a minimum network hop count to reach the first network device according to the topology information;
      add a physical address of the first top-of-rack switch in the first location table to serve as a physical address of the first network device, wherein the physical address of the first top-of-rack switch comprising location information that identifies a physical location by row, column, and room where the first top-of-rack switch is located;
      save, in the first location table, a correspondence between the physical address and the location information of the first network device; and
      update the first location table having the correspondence between the physical address and the location information of the first network device when the dynamic IP address of the first network device changes.

9. The device of claim 8, wherein before saving, in the first location table, the location information of the first network device, the processor is further configured to execute the instructions to save, in a second location table, location information of the first top-of-rack switch, the location information of the first top-of-rack switch comprising an IP address of the first top-of-rack switch and the physical address of the first top-of-rack switch, and wherein when adding a physical address of the first top-of-rack switch in the first location table to serve as a physical address of the first network device, the processor is configured to execute the instructions to add the physical address that is corresponding to the IP address of the first top-of-rack switch in the first location table to serve as the physical address of the first network device when adding the physical address of the first top-of-rack switch in the first location table to serve as the physical address of the first network device.

10. The device of claim 9, wherein before saving, in the second location table, the location information of the first top-of-rack switch, the processor is further configured to execute the instructions to:
   save the physical address of the first top-of-rack switch in the first top-of-rack switch; and
   set a configuration item identifier of the first top-of-rack switch, the configuration item identifier being used for the first top-of-rack switch to send the location information of the first top-of-rack switch.

11. The device of claim 8, wherein the processor is further configured to execute the instructions to:
   receive a first IP address of a network device; and
   determine a physical address and a device model of the network device corresponding to the first IP address according to the first location table.

12. The device of claim 11, wherein the processor is further configured to execute the instructions to trigger the network device corresponding to the first IP address to send alarm indication information.

13. The device of claim 11, wherein the processor is further configured to execute the instructions to trigger another network device except the network device corresponding to the first IP address to send alarm indication information.

14. The device of claim 11, wherein the processor is further configured to execute the instructions to search the topology information for the network device corresponding to the first IP address.

15. The method of claim 1, wherein the topology information of the network comprises network hop count information for the plurality of network devices and the plurality of top-of-rack switches.

16. The method of claim 1, wherein the first network device and the first top-of-rack switch are in a same computing rack.

17. The device of claim 8, wherein the topology information of the network comprises network hop count information for the plurality of network devices and the plurality of top-of-rack switches.

18. The device of claim 8, wherein the first network device and the first top-of-rack switch are in a same computing rack.

19. The device of claim 8, wherein the device is the network controller.

20. The method of claim 1, wherein the network controller performs the method.

* * * * *